(12) United States Patent
Nishikawa (10) Patent No.: US 12,415,764 B2
(45) Date of Patent: Sep. 16, 2025

(54) COMPOSITE MATERIAL, FLYING BODY AND COMPOSITE MATERIAL MANUFACTURING METHOD

(71) Applicant: MITSUBISHI HEAVY INDUSTRIES, LTD., Tokyo (JP)

(72) Inventor: Kosuke Nishikawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 451 days.

(21) Appl. No.: 17/632,628

(22) PCT Filed: Dec. 22, 2020

(86) PCT No.: PCT/JP2020/047847
§ 371 (c)(1),
(2) Date: Feb. 3, 2022

(87) PCT Pub. No.: WO2021/171760
PCT Pub. Date: Sep. 2, 2021

(65) Prior Publication Data
US 2022/0274889 A1    Sep. 1, 2022

(30) Foreign Application Priority Data
Feb. 28, 2020 (JP) .................. 2020-033742

(51) Int. Cl.
*C04B 35/80* (2006.01)
*B32B 7/027* (2019.01)
(Continued)

(52) U.S. Cl.
CPC .............. *C04B 35/80* (2013.01); *B32B 7/027* (2019.01); *B32B 18/00* (2013.01);
(Continued)

(58) Field of Classification Search
CPC ....................................................... C04B 35/80
(Continued)

(56) References Cited

U.S. PATENT DOCUMENTS 5,902,756 A    5/1999   Aly et al.
10,731,237 B1 * 8/2020  Zhu .................. C22C 16/00
(Continued)

FOREIGN PATENT DOCUMENTS

JP    03-265573    11/1991
JP    05-017243    1/1993
(Continued)

OTHER PUBLICATIONS

Extended European Search Report issued Nov. 28, 2022 in European Patent Application No. 20921119.2.
(Continued)

*Primary Examiner* — Tahseen Khan
(74) *Attorney, Agent, or Firm* — Wenderoth, Lind & Ponack, L.L.P.

(57) ABSTRACT

A composite material manufacturing method includes: laminating a first sheet (210) including a first slurry (214) and a third sheet (230) including a third slurry (234); and heating the first sheet (210) and the third sheet (230) that are laminated to a temperature of transforming to ceramics by pyrolysis to form an intermediate body (300). The manufacturing method further includes impregnating the intermediate body (300) with a slurry and heating at a temperature lower than a temperature of transforming to ceramics by pyrolysis.

15 Claims, 8 Drawing Sheets

(51) Int. Cl.
    *B32B 18/00* (2006.01)
    *C04B 35/628* (2006.01)
    *C04B 35/64* (2006.01)
(52) U.S. Cl.
    CPC ........ *C04B 35/62844* (2013.01); *C04B 35/64* (2013.01); *C04B 2235/5256* (2013.01); *C04B 2235/616* (2013.01); *C04B 2235/661* (2013.01)
(58) Field of Classification Search
    USPC .......................................................... 428/212
    See application file for complete search history.

(56) References Cited

U.S. PATENT DOCUMENTS

| | | | | |
|---|---|---|---|---|
| 2005/0191474 | A1* | 9/2005 | Gunn | ...................... B32B 27/36 |
| | | | | 428/212 |
| 2011/0311804 | A1* | 12/2011 | Diss | ........................ F02K 9/974 |
| | | | | 428/448 |
| 2018/0002238 | A1 | 1/2018 | Hockemeyer et al. | |
| 2022/0324206 | A1 | 10/2022 | Hockemeyer et al. | |

FOREIGN PATENT DOCUMENTS

| | | | | |
|---|---|---|---|---|
| JP | 08-157271 | | 6/1996 | |
| JP | 2011-522099 | | 7/2011 | |
| WO | 2016/098022 | | 6/2016 | |
| WO | WO-2016098022 | A1 * | 6/2016 | ............. B32B 18/00 |
| WO | 2018/005105 | | 1/2018 | |
| WO | WO-2018005105 | A1 * | 1/2018 | ............. B28B 1/522 |

OTHER PUBLICATIONS

Translation of the International Preliminary Report on Patentability issued Sep. 9, 2022 in International Application No. PCT/JP2020/047847.

International Search Report issued Mar. 9, 2021 in International (PCT) Application No. PCT/JP2020/047847.

* cited by examiner

A-A Cross Section

COMPOSITE MATERIAL, FLYING BODY AND COMPOSITE MATERIAL MANUFACTURING METHOD

TECHNICAL FIELD

The present invention relates to a composite material, a flying body and a composite material manufacturing method.

BACKGROUND

Patent Literature 1 discloses applying a composition to a component generated from a composite material in order to form a self-repairing layer on the component. The Patent Literature 1 further discloses that the composition includes a colloidal silica suspension, boron or boron compounds in powder form, a silicon carbide in powder form and at least a type of super heat resistant oxide.

CITED LIST

Patent Literature

[Patent Literature 1] Japanese patent application publication No. 2011-522099

SUMMARY

In view of the above situation, an objective is to provide a method of manufacturing a composite material with a plurality of characteristics, for example a high heat resistance and a high strength. Other objectives will be understood from following disclosures and descriptions of embodiments.

A composite material manufacturing method according to an embodiment to achieve the above objective includes: laminating a first sheet including a first slurry and a second sheet including a second slurry; and heating the first sheet and the second sheet that are laminated to a temperature of transforming to ceramics by pyrolysis to form an intermediate body. The manufacturing method further includes impregnating the intermediate body with a third slurry and heating at a temperature lower than the temperature of transforming to ceramics by pyrolysis. A composition of the first slurry is different from a composition of the second slurry.

A composite material according to an embodiment to achieve the above objective is provided with a first layer that includes a first matrix and a second layer that includes a second matrix and is provided below the first layer. The first layer includes a precursor of the first matrix. A composition of the second matrix is different from a composition of the first matrix.

A flying body according to an embodiment to achieve the above objective is provided with the above-mentioned composite material at a part where aerodynamic heating is applied.

According to the above embodiment, the composite material can have a plurality of characteristics.

Figure 1:
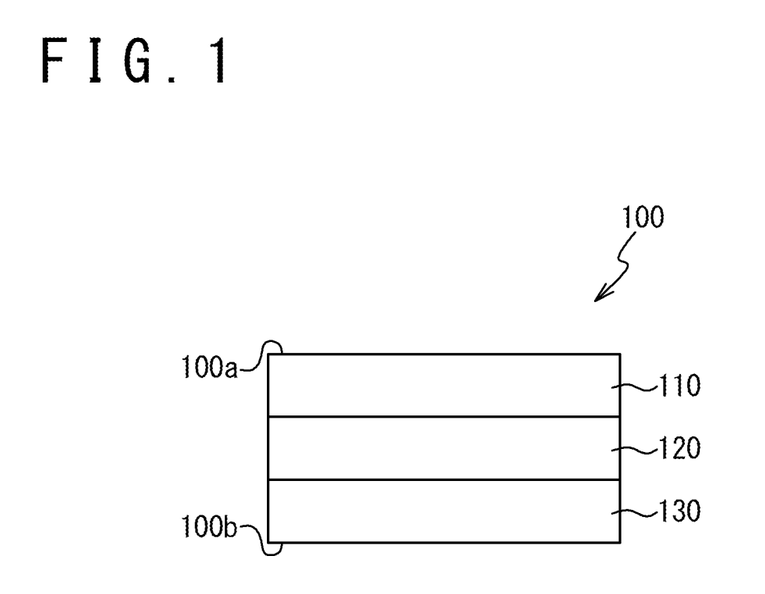
FIG. 1 is a schematic diagram of a composite material according to an embodiment.

DETAILED DESCRIPTION (Embodiment) As shown in FIG. 1, a composite material 100 according to an embodiment is provided with a plurality of layers (including for example a first layer 110, a second layer 120 and a third layer 130). The composite material 100 is provided with an outer surface 100a that is heated and an inner surface 100b that faces the outer surface 100a. When the outer surface 100a of the composite material 100 is heated, an applied heat is transferred from the outer surface 100a to the inner surface 100b by heat conduction. The first layer 110 may form the outer surface 100a of the composite material 100 and may be formed of materials of which a heat resistance is higher than other layers, for example the second layer 120 and/or the third layer 130. The second layer 120 may be formed of a material of which a heat insulation performance is higher than other layers, for example the first layer 110 and/or the third layer 130. The third layer 130 may form the inner surface 100b of the composite material 100 and may be formed of a material which has a strength, for example a tensile strength, a bending strength at high temperature or the like, that is higher than other layers, for example the first layer 110 and/or the second layer 120. The tensile strength is measured according to Japanese Industrial Standards (JIS) R 1606 for example. The bending strength at high temperature may be measured according to JIS R 1604 for example.

Figure 2A:
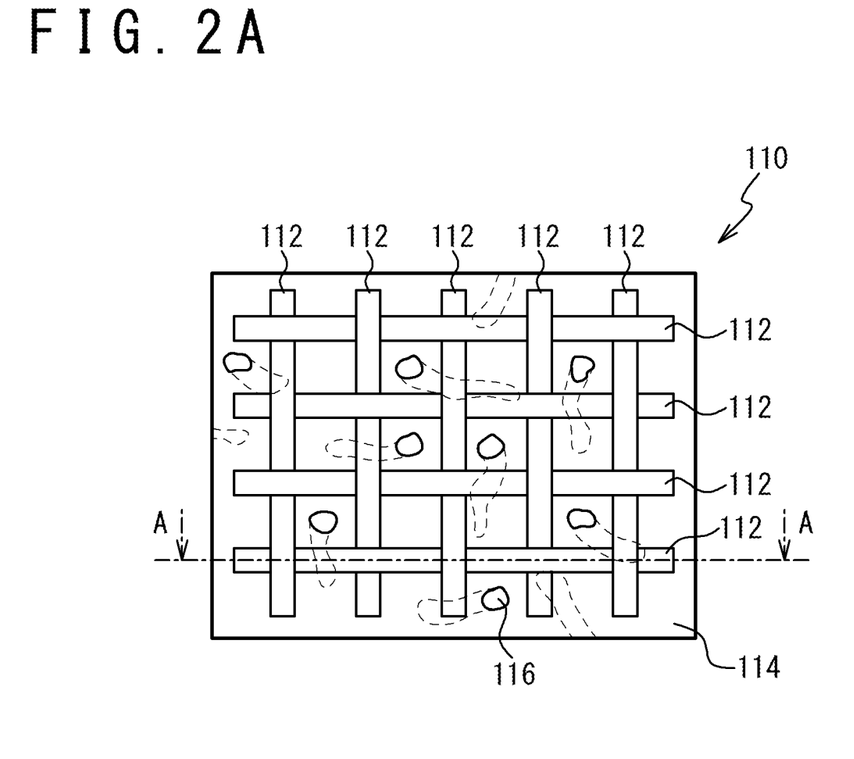
FIG. 2A is a schematic cross-sectional view of a first layer according to an embodiment.
Figure 2B:
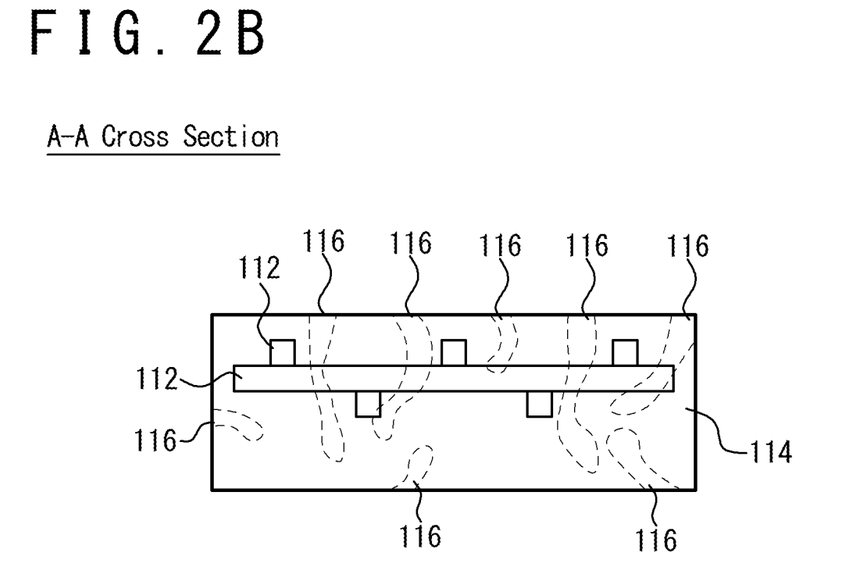
FIG. 2B is a schematic diagram of A-A cross section in FIG. 2A.

The first layer 110 includes reinforced fiber ceramics. For example, as shown in FIGS. 2A and 2B, the first layer 110 is provided with a first reinforced fiber 112, a first matrix 114 and a first precursor 116. The first reinforced fiber 112 includes for example a carbon fiber, a silicon carbide (SiC) fiber, a zirconium borohydride ($ZrB_2$) fiber or a combination thereof. The first matrix 114 is formed of ceramics in a porous shape. The first matrix 114 includes, for example, a material of Ultra High Temperature Ceramics (UHTC) that has a melting point or a decomposition temperature higher than or equal to 2750° C. (for example Zirconium boride ($ZrB_2$), hafnium carbide (HfC), hafnium boride ($HfB_2$)). In addition, the first matrix 114 may partially include a material that has a melting point or a decomposition temperature lower than 2750° C. such as SiC. The first precursor 116 is formed so as to impregnate into pores of the first matrix 114. The first precursor 116 includes a substance before ceramics are formed. The first precursor 116 may include a substance that becomes ceramics when thermally decomposed, for example Polycarbosilane (PCS). An UHTC may include ceramics of which a melting point or a decomposition temperature is higher than 2000° C. The decomposition temperature includes for example a temperature at which a substance is thermally decomposed.

Figure 3:
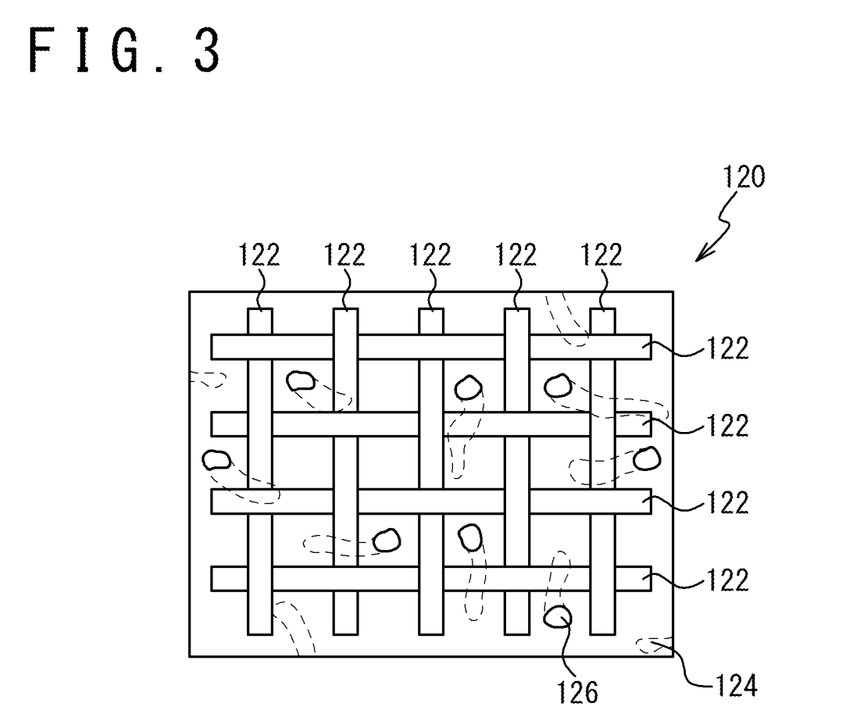
FIG. 3 is a schematic cross-sectional view of a second layer according to an embodiment.

The second layer 120 also includes reinforce fiber ceramics similarly to the first layer 110. For example, as shown in FIG. 3, the second layer 120 is provided with a second reinforced fiber 122, a second matrix 124 and a second precursor 126. The second reinforced fiber 122 includes for example a carbon fiber, a SiC fiber, a $ZrB_2$ fiber or a combination thereof. The second matrix 124 is formed of ceramics in a porous shape. The second matrix 124 may include for example SiC or a material of UHTC that has a melting point or a decomposition temperature higher than or equal to 2750° C. (for example $ZrB_2$, HfC, Zirconium oxide ($ZrO_2$)). The second precursor 126 is formed so as to impregnate into pores of the second matrix 124. The second precursor 126 includes a substance before ceramics are formed. The second precursor 126 may include a substance that becomes ceramics when thermally decomposed, for example PCS.

Figure 4:
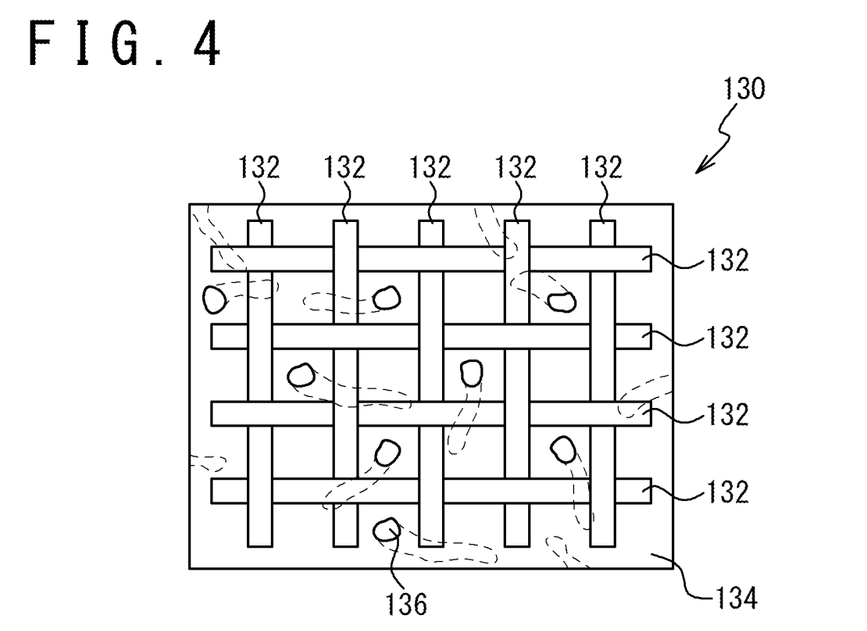
FIG. 4 is a schematic cross-sectional view of a third layer according to an embodiment.

The third layer 130 also includes reinforced fiber ceramics similarly to the first layer 110. For example, as shown in FIG. 4, the third layer 130 is provided with a third reinforced fiber 132, a third matrix 134 and a third precursor 136. The third reinforced fiber 132 includes for example a carbon fiber, a SiC fiber, a $ZrB_2$ fiber or a combination thereof. The third matrix 134 is formed of ceramics in a porous shape. The third matrix 134 may include for example SiC or a material of UHTC that has a melting point or a decomposition temperature higher than or equal to 2750° C. (for example $ZrB_2$, HfC). The third precursor 136 is formed so as to impregnate into pores of the third matrix 134. The third precursor 136 includes a substance before ceramics are formed. The third precursor 136 may include a substance that becomes ceramics when thermally decomposed, for example PCS.

The reinforced fibers of each layer, for example the first reinforced fiber 112, the second reinforced fiber 122 and the third reinforced fiber 132, may be a same material or different materials. The precursors of each layer, for example the first precursor 116, the second precursor 126 and the third precursor 136 may be a same material.

A heat resistance of the first layer 110 may be higher than a heat resistance of another layer, for example the second layer 120 and the third layer 130. For example, a composition of the first matrix 114 (including for example materials and ratio of each material) may be different from a composition of a matrix of another layer, for example a composition of the second matrix 124 and/or a composition of the third matrix 134. The material of the first matrix 114 may be different from the material of another matrix, and even if materials of the first matrix 114 is same as materials of a matrix of another layer, a ratio of each material, for example a mass percent concentration thereof, may be different. A ratio in the first layer 110 of a high heat resistance material, for example $ZrB_2$ and $HfB_2$, that are included in the first matrix 114, for example a mass percent concentration thereof, may be higher than another layer, for example the second layer 120 and/or the third layer 130. The high heat resistance material may include the UHTC. The high heat resistance material may include a material of which a melting point or a decomposition temperature is higher than a decomposition temperature of SiC, for example a UHTC of which a melting point or a decomposition temperature is higher than or equal to 2750° C. The high heat resistance material may be a material of which a mass that decreases in unit time (for example reduction in thickness [g/sec]) when disposed in an environment where air is flowing at a high speed (for example a speed of sound) is lower than SiC, or may be a material of which a length of surface wear in unit time (for example a depletion rate [μm/sec]) is shorter than SiC. Herein, in addition, the length of surface wear in unit time indicates for example a length by which a thickness of a substance reduces during one second when the substance with a desired thickness is disposed in an environment where air is flowing at a high speed (for example a speed of sound). For example, the mass percent concentration of the high heat resistance material in the first layer 110 may be higher than or equal to 3%.

A heat resistance of the second layer 120 may be higher than a heat resistance of a layer in a direction from the second layer 120 to the inner surface 100b, for example the third layer 130. A composition of the second matrix 124 may be different from a composition of the third matrix 134. A ratio, for example a mass percent concentration, in the second layer 120, of a high heat resistance material, for example $ZrO_2$, that is included in the second matrix 124, may be higher than a layer in a direction from the second layer 120 to the inner surface 100b.

A thermal insulation performance of the second layer 120 may be higher than a thermal insulation performance of another layer, for example the first layer 110 and/or the third layer 130. For example, a thermal conductivity of the second layer 120 is lower than a thermal conductivity of the first layer 110 and/or the third layer 130. A thermal conductivity is measured for example according to JIS R1611, JIS R2251 or the like. A ratio, for example a mass percent concentration, of a high thermal insulation performance material, for example $ZrO_2$, that is included in the second matrix 124, to the second layer 120, may be higher than another layer, for example the first layer 110 and/or the third layer 130. The high thermal insulation performance material may include a material of which a thermal conductivity is lower than SiC. The high thermal insulation performance material may include a material of which a thermal conductivity at a desired temperature, for example a room temperature or a high temperature (for example 2000° C.), is lower than SiC.

The composite material 100 can have a high heat resistance and a high strength by including a plurality of layers with different characteristics. The first layer 110 that forms the outer surface 100a to be heated has a high heat resistance. The intermediate layer, for example the second layer 120, has a high thermal insulation performance. The third layer 130 that forms the inner surface 100b has a high strength. Thus, as the temperature of the inner surface 100b is lower than the outer surface 100a even if the outer surface 100a is heated at a high temperature, a high strength material can be used to the third layer 130.

Figure 5:
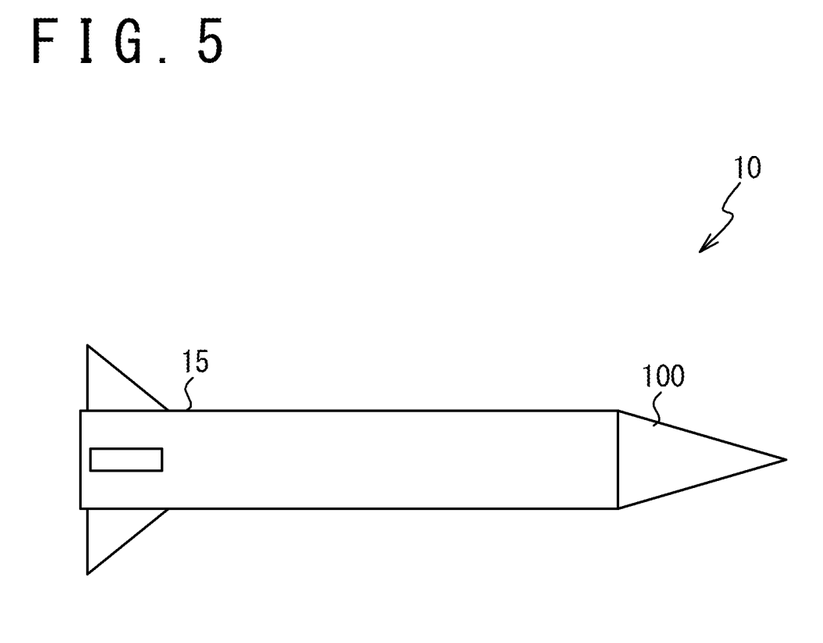
FIG. 5 is a schematic diagram of a flying body according to an embodiment.

The composite material 100 may be applied to a part of which one surface is heated and another surface is not heated. For example, as shown in FIG. 5, the composite material 100 may be provided to a tip part of a flying body 10 (for example a missile). The composite material 100 may be provided to a part where an aerodynamic heating is applied when the flying body 10 flies. The flying body 10 may be provided with a propulsion device 15, for example a rocket motor or a jet engine, and fly at a speed faster than or equal to a speed of sound. The composite material 100 is provided so that an outer surface of the flying body 10 includes the outer surface 100a of the composite material 100.

The composite material 100 can have a high heat resistance and a high strength. As a heat resistance of the first layer 110 that forms the outer surface 100*a* of the composite material 100 is high, the composite material 100 can resist to a high temperature due to an aerodynamic heating. In addition, as the third layer 130 of the composite material 100 has a high strength and is supporting the first layer 110, a deformation of the first layer 110 due to an air pressure to the outer surface 100*a* can be suppressed. As described above, the outer surface 100*a* can keep an air flow even in an air flow, for example an air flow faster than or equal to a speed of sound. As a result, the composite material 100 can regulate an air flow without significantly affecting aerodynamics even in an air flow faster than or equal to a speed of sound.

Figure 6:
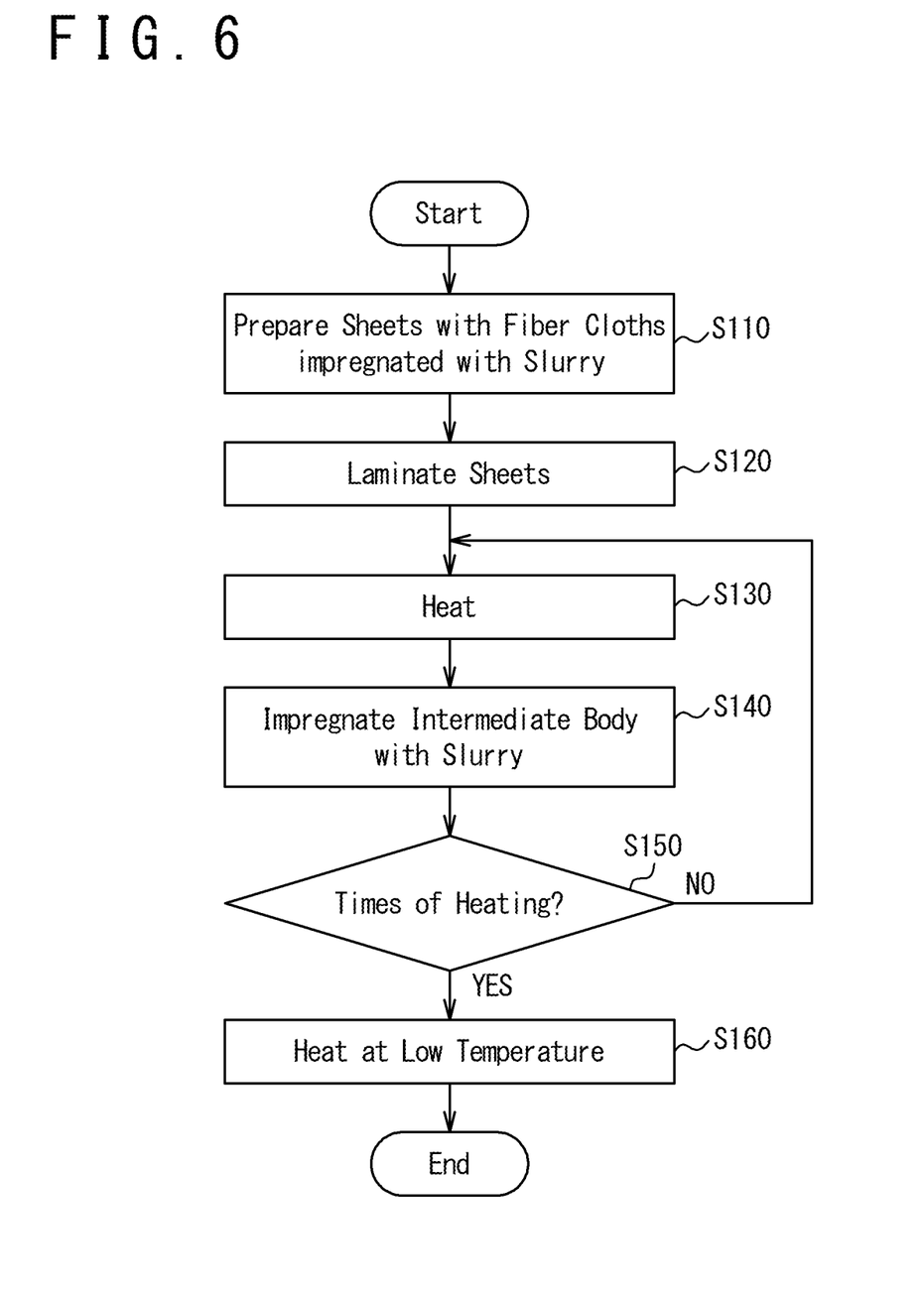
FIG. 6 is a flowchart that shows a composite material manufacturing method according to an embodiment.

(Manufacturing method) The composite material 100 can be manufactured by a method shown in FIG. 6. In step S110, a plurality of sheets in which a fiber cloth is impregnated with a slurry are prepared. For example, a first sheet 210 corresponding to the first layer 110, a second sheet 220 corresponding to the second layer 120 and a third sheet 230 corresponding to the third layer 130 are prepared. A plurality of each of the first sheet 210, the second sheet 220 and the third sheet 230 may be prepared.

Figure 7:
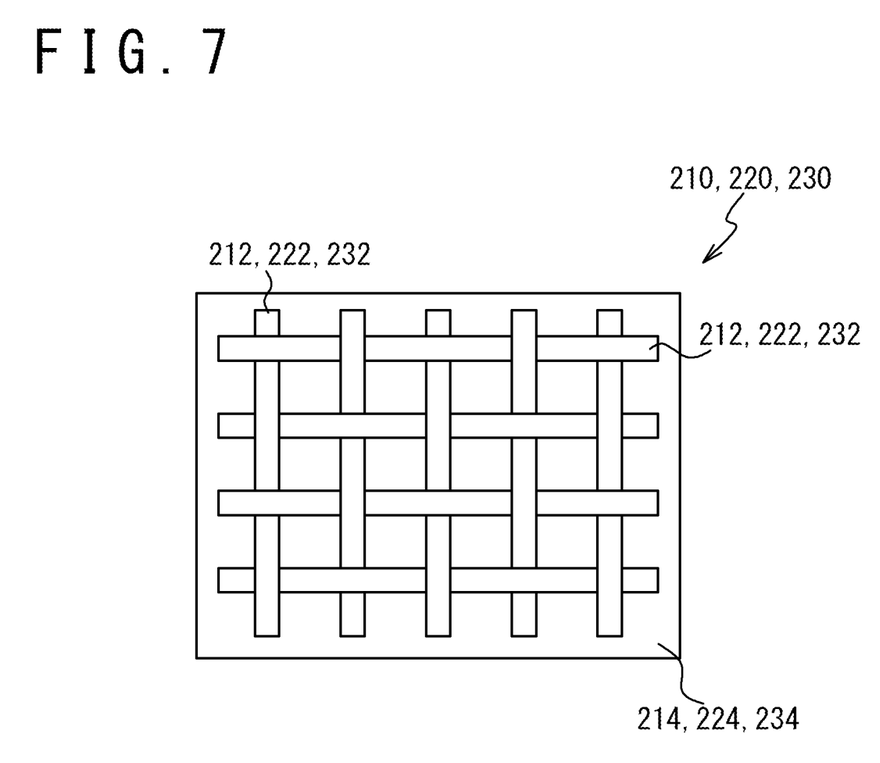
FIG. 7 is a schematic diagram of a sheet used to manufacture a composite material in an embodiment.

For example, as shown in FIG. 7, the first sheet 210 corresponding to the first layer 110 is prepared. A first fiber cloth 212 formed of the first reinforced fiber 112 and a first slurry 214 to form the first matrix 114 are prepared. The first fiber cloth 212 is impregnated with the first slurry 214 to form the first sheet 210. The first slurry 214 includes a precursor mixed with ceramic particles (for example SiC particles, UHTC particles of which a melting point or a decomposition temperature is higher than or equal to 2750° C.), for example a ceramic precursor. This ceramic precursor may include PCS. A plurality of first sheets 210 may be prepared.

For example, the second sheet 220 corresponding to the second layer 120 is prepared. A second fiber cloth 222 formed of the second reinforced fiber 122 and a second slurry 224 to form the second matrix 124 are prepared. The second fiber cloth 222 is impregnated with the second slurry 224 to form the second sheet 220. The second slurry 224 includes a precursor mixed with ceramic particles (for example SiC particles, UHTC particles of which a melting point or a decomposition temperature is higher than or equal to 2750° C.), for example a ceramic precursor. This ceramic precursor may include PCS. A plurality of second sheets 220 may be prepared.

For example, the third sheet 230 corresponding to the third layer 130 is prepared. A third fiber cloth 232 formed of the third reinforced fiber 132 and a third slurry 234 to form the third matrix 134 are prepared. The third fiber cloth 232 is impregnated with the third slurry 234 to form the third sheet 230. The third slurry 234 includes a precursor mixed with ceramic particles (for example SiC particles, UHTC particles of which a melting point or a decomposition temperature is higher than or equal to 2750° C.), for example a ceramic precursor. This ceramic precursor may include PCS. A plurality of third sheets 230 may be prepared.

In accordance with a change of ratio of ceramic particles included in the slurry, characteristics of each layer, for example a heat resistance, a thermal insulation performance or a strength, changes. A composition of the first slurry 214 may be different from a composition of another layer, for example a composition of the second slurry 224 and/or a composition of the third slurry 234. A material of the first slurry 214 may be different from a material of a slurry of another layer, and even if materials of the first slurry 214 are same as materials of a slurry of another layer, a ratio of each material, for example a mass percent concentration, may be different.

A heat resistance of a first sintered body in which the first slurry 214 is thermally decomposed may be higher than a sintered body in which another slurry is thermally decomposed, for example a second sintered body of the second slurry 224 and/or a third sintered body of the third slurry 234. For example, a ratio, for example a mass percent concentration, of particles with high heat resistance in the first slurry 214, for example $ZrB_2$ particles or $HfB_2$ particles, to the whole may be higher than another slurry, for example the second slurry 224 or the third slurry 234.

A thermal insulation performance of the second sintered body in which the second slurry 224 is thermally decomposed may be higher than a sintered body in which another slurry is thermally decomposed, for example the first sintered body of the first slurry 214 and/or the third sintered body of the third slurry 234. A ratio, for example a mass percent concentration, of particles with high thermal insulation performance in the second slurry 224, for example $ZrO_2$ particles, to the whole may be higher than another slurry, for example the first slurry 214 and/or the third slurry 234.

A strength of the third sintered body in which the third slurry 234 is thermally decomposed may be higher than a sintered body in which another slurry is thermally decomposed, for example the first sintered body of the first slurry 214 and/or the second sintered body of the second slurry 224. A ratio, for example a mass percent concentration, of particles with high strength in the third slurry 234, for example SiC particles, to the whole may be higher than another slurry, for example the first slurry 214 and/or the second slurry 224.

Figure 8:
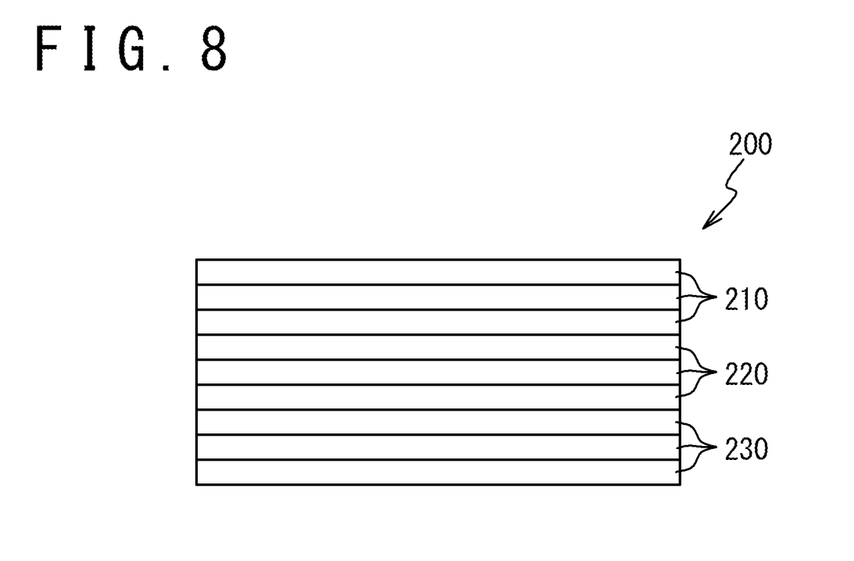
FIG. 8 is a schematic diagram of a laminated body according to an embodiment.

In step S120, the sheets that are prepared are laminated and a laminated body 200 is formed. For example, as shown in FIG. 8, the first sheet 210 may be arranged on the second sheet 220 and the second sheet 220 may be arranged on the third sheet 230. In addition, the second sheet 220 is arranged between the first sheet 210 and the third sheet 230. A plurality of first sheets 210 may form the first layer 110, a plurality of second sheets 220 may form the second layer 120 and a plurality of third sheets 230 may form the third layer 130. The plurality of second sheets 220 may be arranged between the plurality of first sheets 210 and the plurality of third sheet 230.

Figure 9:
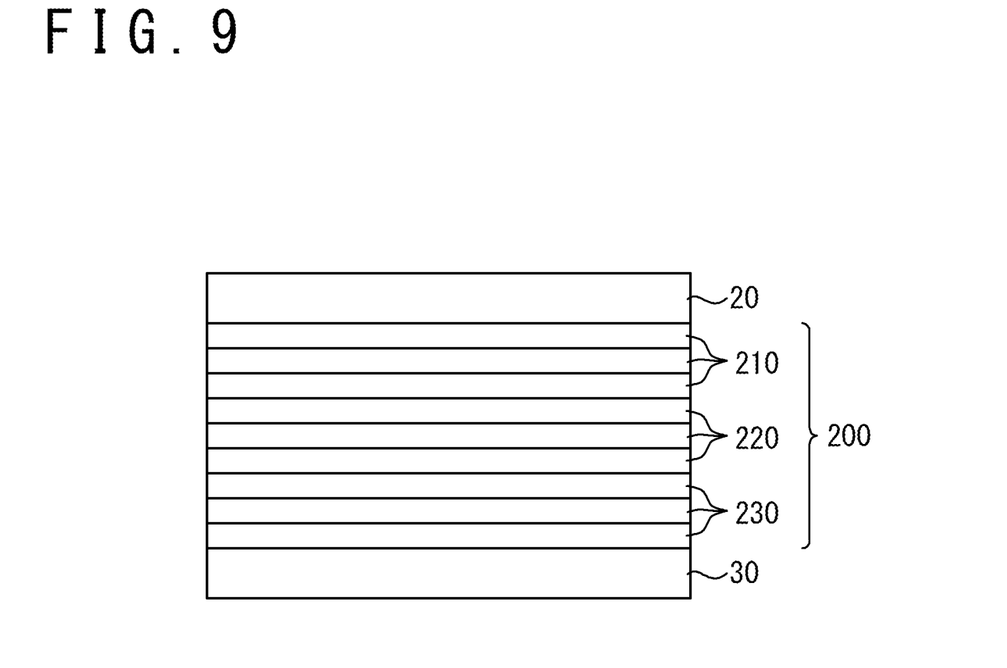
FIG. 9 is a diagram to explain a pyrolysis of a laminated body in an embodiment.

In step S130, the laminated body 200 is thermally decomposed by being heated in a vacuum atmosphere or an inert atmosphere (including for example a nitrogen atmosphere and an argon atmosphere) and an intermediate body 300 is formed. As shown in FIG. 9, the laminated sheets are heated in a state of being sandwiched between a forming mold 20 and a forming mold 30. The forming mold 20 and the forming mold 30 may apply pressure to the laminated sheets. The sheets are heated to a temperature at which the first slurry 214, the second slurry 224 and the third slurry 234 transform to ceramics by pyrolysis, for example a temperature between 800° C. and 1000° C. The forming mold 20 and the forming mold 30 include for example a metal mold, a carbon mold or the like.

Figure 10:
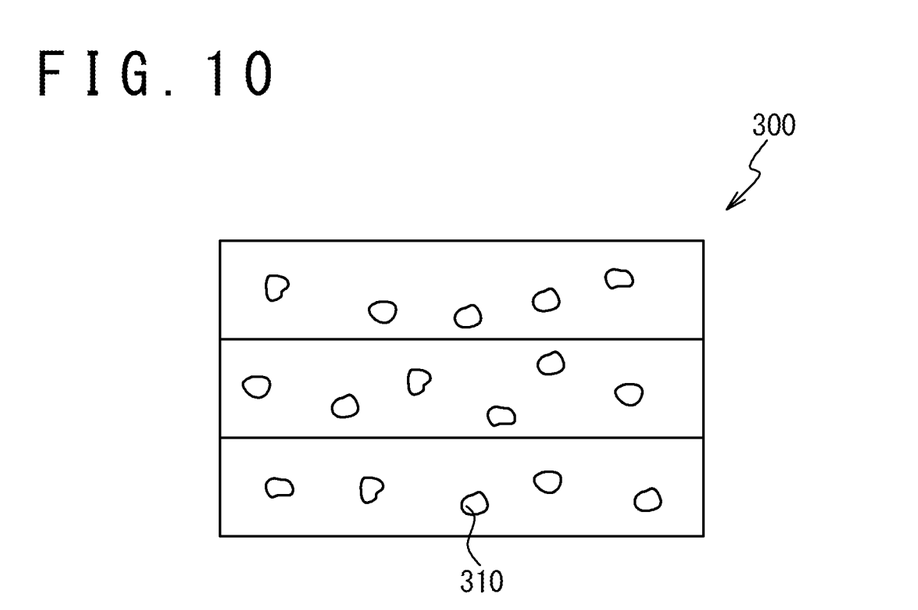
FIG. 10 is a schematic diagram of an intermediate body according to an embodiment.

In step S140, the intermediate body 300 that is thermally decomposed is impregnated with a slurry. As shown in FIG. 10, a plurality of pores 310 are formed in the intermediate body 300 in accordance with a ceramic yield. The intermediate body 300 is impregnated with slurry so as to fill the pores 310 of the intermediate body 300. The intermediate body 300 may be impregnated in a vacuum chamber adjusted to a vacuum atmosphere. The slurry with which the intermediate body 300 is impregnated may be any one of the first slurry 214, the second slurry 224 and the third slurry 234. The slurry with which the intermediate body 300 is impregnated may be a slurry different from the first slurry 214, the second slurry 224 and the third slurry 234. It should be noted that the ceramic yield may include a ratio between a mass of the ceramic precursor and a mass of the ceramics obtained by heating this ceramic precursor.

In step 150, a number of times of heating is compared to a desired number of times. When the number of times of heating has not reached the desired number of times (step S150: NO), the process returns to step S130. When the number of times of heating has reached a desired number of times (step S150: YES), the process shifts to step S160. The desired number of times is determined in accordance with characteristics of the composite material 100 to be manufactured. For example, the desired number of times may include a number less than or equal to 3 and may include 1. It should be noted that in a second and subsequent process of step S130, the forming molds 20 and 30 may not be used.

In step S160, the intermediate body 300 that is impregnated with the slurry is heated at a low temperature. The temperature to heat the intermediate body 300 is lower than the temperature at which the slurry transforms to ceramics by pyrolysis. The temperature of heating in step S160 may be lower than a temperature at which a mass loss due to pyrolysis behavior becomes a desired ratio to a mass before heating. This desired ratio includes for example a ratio less than or equal to 10%. The desired ratio may be a ratio less than or equal to 5%. The ratio of the mass loss is measured by use of Thermal Gravimetric (TG) analysis, Thermal Gravimetric-Differential Thermal Analysis (TG-DTA) or the like. For example, when the immersed slurry is PCS, the temperature to heat may be less than 400° C.

As described above, by finally heating the intermediate body 300 that is impregnated with the slurry at a low temperature, a composite material 100 in which a composition of the first layer 110, a composition of the second layer 120 and a composition of the third layer 130 are different can be manufactured. In addition, by keeping the temperature to heat low, a ratio of the pores 310 that occupy the composite material 100 can be suppressed.

By limiting the number of times of heating processes, the composite material 100 can include a plurality of layers with different characteristics. In step 140, a same slurry is immersed in pores 310 formed in each layer of the intermediate body 300. As a result, matrixes with a same composition are sintered in the pores 310 in each layer. By repeating heating processes and impregnations with slurry, compositions of matrixes in each layer become similar. By limiting the number of times of heating processes, each layer can have different characteristics.

Furthermore, by limiting the number of times of heating processes, a dense structure can be manufactured in few steps. As a result, a manufacturing cost is suppressed.

By including precursors (for example, the first precursor 116, the second precursor 126, the third precursor 136 and the like), the composite material 100 can have a high heat resistance. When the composite material 100 is heated, the first precursor 116, the second precursor 126 and the third precursor 136 can be thermally decomposed and can absorb heat. In addition, by vaporization of the first precursor 116, the second precursor 126 and the third precursor 136, a heat input into the composite material 100 due to aerodynamic heating can be suppressed.

(Variation example) The composite material 100 may be composed of two layers, three layers or more. For example, the composite material 100 may be composed of the first layer 110 having a high heat resistance and the third layer 130 having a high strength. The composite material 100 may be provided with a layer having a heat resistance lower than the first layer 110 and higher than the second layer 120 between the first layer 110 and the second layer 120.

Figure 11:
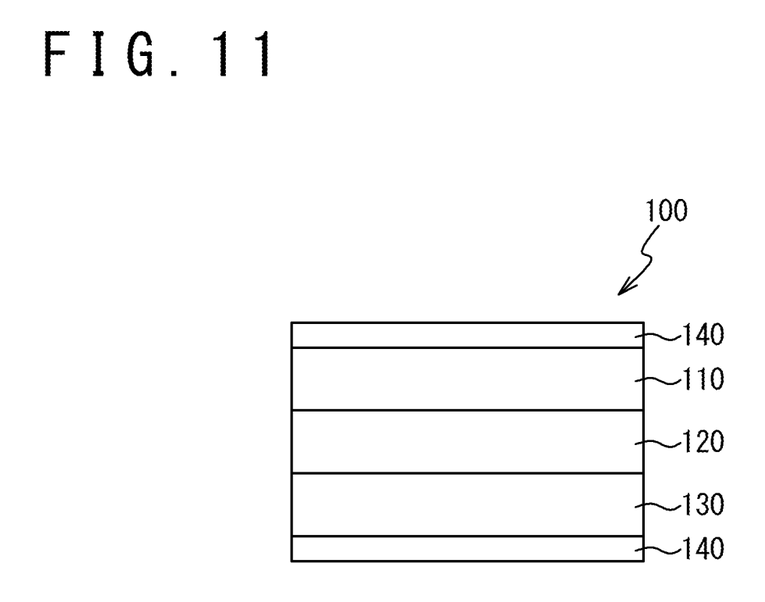
FIG. 11 is a schematic diagram of a composite material according to an embodiment.

As shown in FIG. 11, the composite material 100 may be provided with an anti-hygroscopic coating 140. The anti-hygroscopic coating 140 may include a coating that enhances water repellency, for example a polymer coating. The anti-hygroscopic coating 140 can suppress a deterioration, for example oxidation, decomposition or the like, of a precursor, for example the first precursor 116, the second precursor 126 and/or the third precursor 136, that the composite material 100 includes.

The embodiments and variation examples that are described above are examples and may be modified as long as the function is not interfered. In addition, the configurations described in each embodiment and each variation example can be arbitrarily modified and/or arbitrarily combined as long as the function is not interfered.

The composite material manufacturing method according to each embodiment is understood for example as follows.

A composite material manufacturing method according to a first aspect includes: laminating a first sheet (210) including a first slurry (214) and a second sheet (230) including a second slurry (234); and heating the first sheet (210) and the second sheet (230) that are laminated to a temperature of transforming to ceramics by pyrolysis to form an intermediate body (300). The manufacturing method further includes impregnating the intermediate body (300) with a third slurry and heating at a temperature lower than the temperature of transforming to ceramics by pyrolysis.

By heating the intermediate body (300) at a temperature lower than a temperature of transforming to ceramics by pyrolysis, the composite material (100) can be provided with a plurality of layers that have a plurality of characteristics. As a result, the composite material can have a plurality of characteristics, for example a high heat resistance and a high strength.

A composite material manufacturing method according to a second aspect is the composite material manufacturing method according to the first aspect and the lower temperature when heating the intermediate body (300) is configured to be a temperature at which a mass loss of the third slurry due to heating becomes in a desired ratio to a mass before heating.

A composite material manufacturing method according to a third aspect is the composite material manufacturing method according to the second aspect and the desired ratio of the mass loss of the third slurry due to heating to the mass before heating is configured to be a ratio less than or equal to 10%.

As the temperature when heating the intermediate body (300) is up to a temperature at which the mass loss of the third slurry becomes a desired ratio, the manufactured composite material (100) can include precursors (116, 126, 136). As a result, a ratio of pores (310) that occupy the composite material (100) can be suppressed.

A composite material manufacturing method according to a fourth aspect is the composite material manufacturing method according to the first aspect and is configured so that a heat resistance of a first sintered body in which the first slurry (214) is thermally decomposed becomes higher than a second sintered body in which the second slurry (234) is thermally decomposed.

As a result, as the first layer (110) in which the first sheet (210) including the first slurry (214) is thermally decomposed has a high heat resistance, the composite material (100) has a high heat resistance to a heat applied from a surface (100a) of the first layer (110).

A composite material manufacturing method according to a fifth aspect is the composite material manufacturing method according to the fourth aspect and is configured so that a strength of the second sintered body becomes higher than a strength of the first sintered body.

As a result, as the second layer (130) in which the second sheet (230) including the second slurry (234) is thermally decomposed has a high strength, the second layer (130) supports the first layer (110) and the composite material (100) has a high strength.

A composite material manufacturing method according to a sixth aspect is the composite material manufacturing method according to the first aspect and the laminating includes laminating a third sheet (220) including a fourth slurry (224) between the first sheet (210) and the second sheet (230). Heating the first sheet (210) and the second sheet (220) includes heating the third sheet (220) to a temperature of transforming to ceramics. In addition, a composition of the fourth slurry (224) is different from a composition of the first slurry (214) and a composition of the second slurry (234).

As a result, the manufactured composite material can include three or more layers having different characteristics.

A composite material manufacturing method according to a seventh aspect is the composite material manufacturing method according to the sixth aspect and is configured so that a thermal insulation performance of a third sintered body in which the fourth slurry (224) is thermally decomposed becomes higher than a thermal insulation performance of the first sintered body in which the first slurry (214) is thermally decomposed.

A composite material manufacturing method according to an eighth aspect is the composite material manufacturing method according to the sixth aspect and is configured so that the thermal insulation performance of the third sintered body in which the fourth slurry (224) is thermally decomposed is higher than a thermal insulation performance of the second sintered body in which the second slurry (234) is thermally decomposed.

As the manufactured composite material includes the third layer (120) with a high thermal insulation performance between the first layer (110) and the second layer (130), a conduction of heat of the first layer (110) that is heated to the second layer (130) can be suppressed.

The composite material according to each embodiment is understood for example as follows.

A composite material according to a ninth aspect is provided with a first layer (110) that includes a first matrix (114) and a second layer (130) that includes a second matrix (134) and is provided under the first layer (110). The first layer (110) includes a precursor of the first matrix (114). A composition of the second matrix (134) is different from a composition of the first matrix (114).

The composite material can be provided with a plurality of layers that have a plurality of characteristics. As a result, the composite material can have a plurality of characteristics, for example a high heat resistance and a high strength. In addition, as the first layer (110) includes a precursor of the first matrix (114), a ratio of pores (310) that occupy the composite material (100) can be suppressed.

The composite material according to a tenth aspect is the composite material according to the ninth aspect and is configured so that a heat resistance of the first layer (110) is higher than a heat resistance of the second layer (130).

The composite material has a high heat resistance to a heat applied from a surface (100a) of the first layer (110).

A composite material according to an eleventh aspect is the composite material according to the ninth aspect and is configured so that a strength of the second layer (130) is higher than a strength of the first layer (110).

As the second layer (130) has a high strength, the second layer (130) supports the first layer (110) and the composite material has a high strength.

A composite material according to a twelfth aspect is the composite material according to the ninth aspect and is further provided with a third layer (120) that includes a third matrix (134) and is provided between the first layer (110) and the second layer (130). A thermal insulation performance of the third layer (120) is higher than a thermal insulation performance of the first layer (110).

A composite material according to a thirteenth aspect is the composite material according to the twelfth aspect and is configured so that the thermal insulation performance of the third layer (120) becomes higher than a thermal insulation performance of the second layer (130).

As the composite material includes the third layer (120) with a high thermal insulation performance between the first layer (110) and the second layer (130), a conduction of heat of the first layer (110) that is heated to the second layer (130) can be suppressed.

A composite material according to a fourteenth aspect is the composite material according to the ninth aspect and is configured so that the first layer (110) forms an outer surface (100a) and the outer surface (100a) regulates an air flow.

A composite material according to a fifteenth aspect is the composite material according to the fourteenth aspect and is configured so that the outer surface (100a) regulates the air flow that is faster or equal to a speed of sound.

The flying body according to each embodiment is understood for example as follows.

A flying body according to a sixteenth aspect is provided with the composite material according to the ninth aspect at a part where an aerodynamic heating is applied.

It should be noted that the present application claims priority based on Japanese Patent Application No. 2020-033742 filed on Feb. 28, 2020, the whole disclosure of which is incorporated herein by reference.

The invention claimed is:

1. A composite material manufacturing method including:
laminating a first sheet including a first slurry and a second sheet including a second slurry;
heating the first sheet and the second sheet that are laminated to a first temperature at which the first slurry and the second slurry transform to ceramics by pyrolysis to form an intermediate body; and
impregnating the intermediate body with a third slurry and heating the impregnated intermediate body at a second temperature, the second temperature being lower than a third temperature at which the third slurry transforms to ceramics by pyrolysis,
wherein a first composition of the first slurry is different from a second composition of the second slurry, and
wherein the first slurry includes a ceramic precursor, the second slurry includes a ceramic precursor, and the third slurry includes a ceramic precursor.

2. The composite material manufacturing method according to claim 1,
wherein the second temperature is a temperature at which a mass loss of the third slurry due to heating becomes in a desired ratio to a mass of the third slurry before heating.

3. The composite material manufacturing method according to claim 2,
wherein the desired ratio is a ratio less than or equal to 10%.

4. The composite material manufacturing method according to claim 1, wherein a first heat resistance of a first sintered body in which the first slurry is thermally decomposed is higher than a second heat resistance of a second sintered body in which the second slurry is thermally decomposed.

5. The composite material manufacturing method according to claim 4,
wherein a second strength of the second sintered body is higher than a first strength of the first sintered body.

6. The composite material manufacturing method according to claim 1,
wherein the laminating includes laminating a third sheet including a fourth slurry between the first sheet and the second sheet,
wherein the heating of the first sheet and the second sheet includes heating the third sheet to the first temperature, the first temperature being a temperature at which the fourth slurry transforms to ceramics by pyrolysis,
wherein a third composition of the fourth slurry is different from the first composition of the first slurry and the second composition of the second slurry, and
wherein the fourth slurry includes a ceramic precursor.

7. The composite material manufacturing method according to claim 6, wherein a second thermal insulation performance of a second sintered body in which the fourth slurry is thermally decomposed is higher than a first thermal insulation performance of a first sintered body in which the first slurry is thermally decomposed.

8. The composite material manufacturing method according to claim 6,
wherein a first thermal insulation performance of a first sintered body in which the fourth slurry is thermally decomposed is higher than a second thermal insulation performance of a second sintered body in which the second slurry is thermal decomposed.

9. A flying body comprising a composite material at a part where aerodynamic heating is applied, the composite material comprising:
a first layer that includes a first matrix; and
a second layer that includes a second matrix and is provided below the first layer,
wherein the first layer includes a precursor of the first matrix, and
wherein the first matrix includes Ultra High Temperature Ceramics (UHTC) particles that have a melting point or a decomposition temperature greater than or equal to 2750° C., a composition of the second matrix is different from a composition of the first matrix, and the first matrix includes more UHTC particles than the second matrix.

10. The flying body according to claim 9,
wherein a heat resistance of the first layer is higher than a heat resistance of the second layer.

11. The flying body according to claim 9,
wherein a strength of the second layer is higher than a strength of the first layer.

12. The flying body according to claim 9, further comprising a third layer with a third matrix, the third layer provided between the first layer and the second layer,
wherein a heat resistance of the third layer is higher than a heat resistance of the first layer.

13. The flying body according to claim 12,
wherein the heat resistance of the third layer is higher than a heat resistance of the second layer.

14. The flying body according to claim 9,
wherein the first layer forms an outer surface, and
wherein the outer surface regulates an air flow.

15. The flying body according to claim 14,
wherein the air flow is faster than or equal to a speed of sound.

* * * * *